US012332381B2

(12) United States Patent
Richards et al.

(10) Patent No.: US 12,332,381 B2
(45) Date of Patent: Jun. 17, 2025

(54) 3D SENSING

(71) Applicant: CAMBRIDGE MECHATRONICS LIMITED, Cambridge (GB)

(72) Inventors: David Richards, Cambridge (GB); Joshua Carr, Cambridge (GB)

(73) Assignee: CAMBRIDGE MECHATRONICS LIMITED, Cambridge (GB)

( * ) Notice: Subject to any disclaimer, the term of this patent is extended or adjusted under 35 U.S.C. 154(b) by 1153 days.

(21) Appl. No.: 17/265,337

(22) PCT Filed: Aug. 7, 2019

(86) PCT No.: PCT/GB2019/052227
§ 371 (c)(1),
(2) Date: Feb. 2, 2021

(87) PCT Pub. No.: WO2020/030916
PCT Pub. Date: Feb. 13, 2020

(65) Prior Publication Data
US 2021/0311171 A1 Oct. 7, 2021

(30) Foreign Application Priority Data

| Aug. 7, 2018 | (GB) | 1812818 |
| May 15, 2019 | (GB) | 1906885 |
| Jul. 3, 2019 | (GB) | 1909605 |

(51) Int. Cl.
*G01S 7/481* (2006.01)
*G01S 7/497* (2006.01)
(Continued)

(52) U.S. Cl.
CPC .......... *G01S 7/4815* (2013.01); *G01S 7/4817* (2013.01); *G01S 7/497* (2013.01); *G01S 17/42* (2013.01); *G01S 17/894* (2020.01)

(58) Field of Classification Search
CPC ........ G01S 7/497; G01S 17/42; G01S 17/894
See application file for complete search history.

(56) References Cited

U.S. PATENT DOCUMENTS 7,089,114 B1 * 8/2006 Huang ................. B60T 7/22
340/904
2004/0151466 A1 8/2004 Crossman-Bosworth et al.
(Continued)

FOREIGN PATENT DOCUMENTS

| CN | 105100638 A | 11/2015 |
| CN | 106489265 A | 3/2017 |

(Continued)

OTHER PUBLICATIONS

Ruffin, P. B., "Optical MEMS-based arrays," Proceedings of Spie, vol. 5055, pp. 230-241 (2003).
(Continued)

*Primary Examiner* — Isam A Alsomiri
*Assistant Examiner* — Joseph C Fritchman
(74) *Attorney, Agent, or Firm* — Van Hoven PC; Stefan D. Osterbur; Joshua Van Hoven

(57) ABSTRACT

Broadly speaking, embodiments of the present techniques provide apparatus and methods for generating a three-dimensional (3D) representation of a scene (also known as 3D sensing) using a time-of-flight imaging system. In particular, the present techniques provide an apparatus comprising a time-of-flight imaging camera system that emits illumination having a spatially-nonuniform intensity over a field of view of the sensor that is moved across at least part of the field of view of a sensor using an actuation mechanism.

31 Claims, 11 Drawing Sheets

(51) Int. Cl.
*G01S 17/42* (2006.01)
*G01S 17/894* (2020.01)

(56) References Cited

U.S. PATENT DOCUMENTS

| | | |
|---|---|---|
| 2004/0246555 A1 | 12/2004 | Kohl et al. |
| 2009/0185032 A1 | 7/2009 | Sakai et al. |
| 2012/0038903 A1 | 2/2012 | Weimer |
| 2012/0230665 A1 | 9/2012 | Okamoto et al. |
| 2013/0002933 A1 | 1/2013 | Topliss et al. |
| 2013/0300838 A1 | 11/2013 | Borowski |
| 2015/0163474 A1 | 6/2015 | You et al. |
| 2015/0253429 A1 | 9/2015 | Dorrington et al. |
| 2015/0293224 A1 | 10/2015 | Eldada et al. |
| 2015/0331107 A1 | 11/2015 | Galera et al. |
| 2016/0182788 A1 | 6/2016 | Wan et al. |
| 2016/0182895 A1* | 6/2016 | Ko .................. G01S 17/894 348/46 |
| 2016/0259038 A1 | 9/2016 | Retterath et al. |
| 2017/0176579 A1* | 6/2017 | Niclass ................ G01S 17/10 |
| 2017/0310948 A1* | 10/2017 | Pei .................... G01S 7/4817 |
| 2018/0020209 A1 | 1/2018 | Ko et al. |
| 2018/0062345 A1* | 3/2018 | Bills ................... G01S 7/4815 |
| 2018/0063392 A1 | 3/2018 | Wan et al. |
| 2018/0077406 A1 | 3/2018 | Ko et al. |
| 2018/0301874 A1* | 10/2018 | Burroughs ............ H01S 5/4025 |
| 2018/0332271 A1 | 11/2018 | Aono |
| 2019/0187255 A1* | 6/2019 | Jang ....................... G02B 7/021 |

FOREIGN PATENT DOCUMENTS

| | | |
|---|---|---|
| CN | 106574964 A | 4/2017 |
| CN | 106664353 A | 5/2017 |
| DE | 102015221921 A1 * | 10/2016 |
| EP | 1592992 B1 | 5/2012 |
| EP | 3301478 | 4/2018 |
| EP | 3318894 | 5/2018 |
| JP | 2005077130 | 3/2005 |
| JP | 2009-148369 A | 7/2009 |
| JP | 2017-195569 A | 10/2017 |
| JP | 6253857 B1 | 12/2017 |
| WO | WO 2001085491 | 11/2001 |
| WO | 2011/065296 A1 | 6/2011 |
| WO | WO 2017200896 | 11/2017 |
| WO | WO 2018044958 | 3/2018 |

OTHER PUBLICATIONS

GB Search Report dated Mar. 27, 2020 of GB Application 1909605.6.

GB Search Report dated Feb. 5, 2019 of GB Application 1812818.1.

* cited by examiner (A)

(B)

3D SENSING

CROSS-REFERENCE TO RELATED APPLICATIONS

This application is a national stage application under 35 U.S.C. § 371 of International Application PCT/GB2019/052227, filed Aug. 7, 2019, which claims priority of GB Patent Applications 1812818.1, filed Aug. 7, 2018, 1906885.7, filed May 15, 2019, and 1909605.6, filed Jul. 3, 2019. The disclosure of which are hereby incorporated by reference herein in their entireties.

The present application generally relates to apparatus and methods for generating a three-dimensional (3D) representation of a scene (also known as 3D sensing), and in particular to generating a 3D representation using a time-of-flight imaging system.

In a first approach of the present techniques, there is provided an apparatus for use in generating a three-dimensional representation of a scene, the apparatus comprising: a time-of-flight (ToF) imaging camera system comprising a multipixel sensor and a light source and arranged to emit illumination having a spatially-nonuniform intensity over the field of view of the sensor; and an actuation mechanism for moving the illumination across at least part of the field of view of the sensor, thereby enabling generation of the representation. This may be achieved without moving the sensor.

The non-uniform illumination may be any form of illumination, including a beam of light, a pattern of light, a striped pattern of light, a dot pattern of light. It will be understood that these are merely example types of illumination and are non-limiting.

The apparatus may be (or may be included in) any of: a smartphone, a mobile computing device, a laptop, a tablet computing device, a security system, a gaming system, an augmented reality system, an augmented reality device, a wearable device, a drone, an aircraft, a spacecraft, a vehicle, an autonomous vehicle, a robotic device, a consumer electronics device, a domotic device, and a home automation device, for example.

In a second approach of the present techniques, there is provided a method for use in generating a three-dimensional representation of a scene, the method comprising: emitting, using a time-of-flight (ToF) imaging camera system, illumination having a spatially-nonuniform intensity over the field of view of a sensor used to receive the reflected light; and moving, using an actuation mechanism, the illumination across at least part of the field of view of the sensor, thereby enabling generation of the representation.

The apparatus described herein may be used for a number of technologies or purposes (and their related devices or systems), such as 3D sensing, depth mapping, aerial surveying, terrestrial surveying, surveying in or from space, hydrographic surveying, underwater surveying, scene detection, collision warning, security, facial recognition, augmented reality, advanced driver-assistance systems in vehicles, autonomous vehicles, gaming, gesture control/recognition, robotic device control, touchless technology, and home automation. It will be understood that this is a non-exhaustive list of example technologies which may benefit from utilising the present apparatus.

In a related approach of the present techniques, there is provided a non-transitory data carrier carrying processor control code to implement any of the methods described herein.

Preferred features are set out in the appended dependent claims.

As will be appreciated, the present techniques may be embodied as a system, method or computer program product. Accordingly, present techniques may take the form of an entirely hardware embodiment, an entirely software embodiment, or an embodiment combining software and hardware aspects.

Furthermore, the present techniques may take the form of a computer program product embodied in a computer readable medium having computer readable program code embodied thereon. The computer readable medium may be a computer readable signal medium or a computer readable storage medium. A computer readable medium may be, for example, but is not limited to, an electronic, magnetic, optical, electromagnetic, infrared, or semiconductor system, apparatus, or device, or any suitable combination of the foregoing.

Computer program code for carrying out operations of the present techniques may be written in any combination of one or more programming languages, including object oriented programming languages and conventional procedural programming languages. Code components may be embodied as procedures, methods or the like, and may comprise sub-components which may take the form of instructions or sequences of instructions at any of the levels of abstraction, from the direct machine instructions of a native instruction set to high-level compiled or interpreted language constructs.

Embodiments of the present techniques also provide a non-transitory data carrier carrying code which, when implemented on a processor, causes the processor to carry out any of the methods described herein.

The techniques further provide processor control code to implement the above-described methods, for example on a general purpose computer system or on a digital signal processor (DSP). The techniques also provide a carrier carrying processor control code to, when running, implement any of the above methods, in particular on a non-transitory data carrier. The code may be provided on a carrier such as a disk, a microprocessor, CD- or DVD-ROM, programmed memory such as non-volatile memory (e.g. Flash) or read-only memory (firmware), or on a data carrier such as an optical or electrical signal carrier. Code (and/or data) to implement embodiments of the techniques described herein may comprise source, object or executable code in a conventional programming language (interpreted or compiled) such as C, or assembly code, code for setting up or controlling an ASIC (Application Specific Integrated Circuit) or FPGA (Field Programmable Gate Array), or code for a hardware description language such as Verilog (RTM) or VHDL (Very high speed integrated circuit Hardware Description Language). As the skilled person will appreciate, such code and/or data may be distributed between a plurality of coupled components in communication with one another. The techniques may comprise a controller which includes a microprocessor, working memory and program memory coupled to one or more of the components of the system.

It will also be appreciated that all or part of a logical method according to embodiments of the present techniques may suitably be embodied in a logic apparatus comprising logic elements to perform the steps of the above-described methods, and that such logic elements may comprise components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

In some embodiments, the present techniques may be realised in the form of a data carrier having functional data thereon, said functional data comprising functional computer data structures to, when loaded into a computer system or network and operated upon thereby, enable said computer system to perform all the steps of the above-described method.

Implementations of the present techniques will now be described, by way of example only, with reference to the accompanying drawings, in which.

Figure 3:
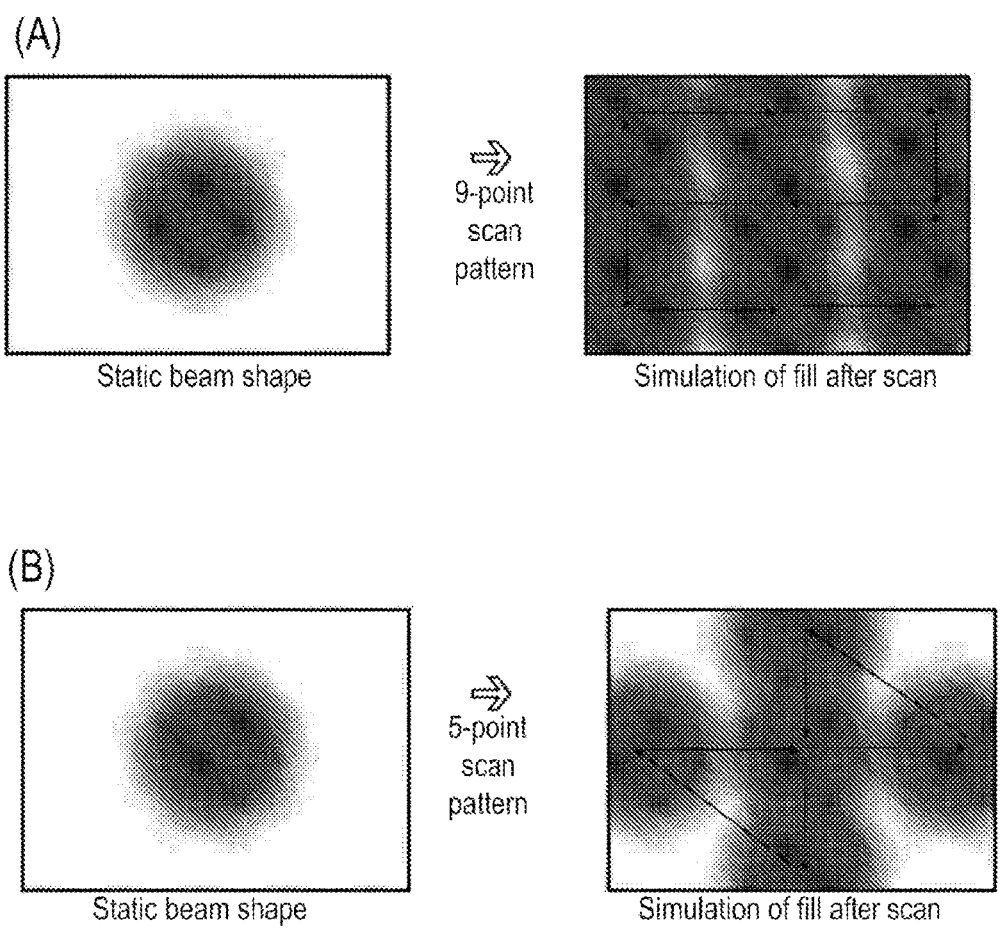
Figure 4:
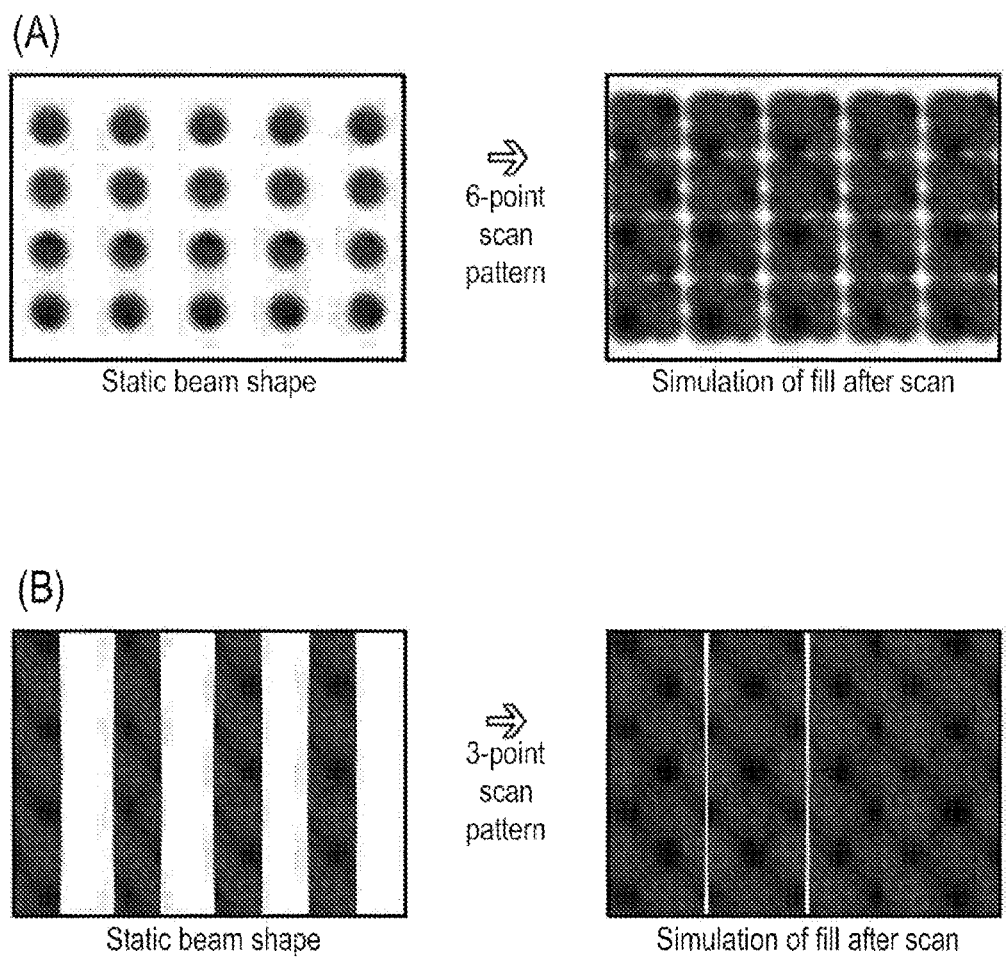
Figure 5:
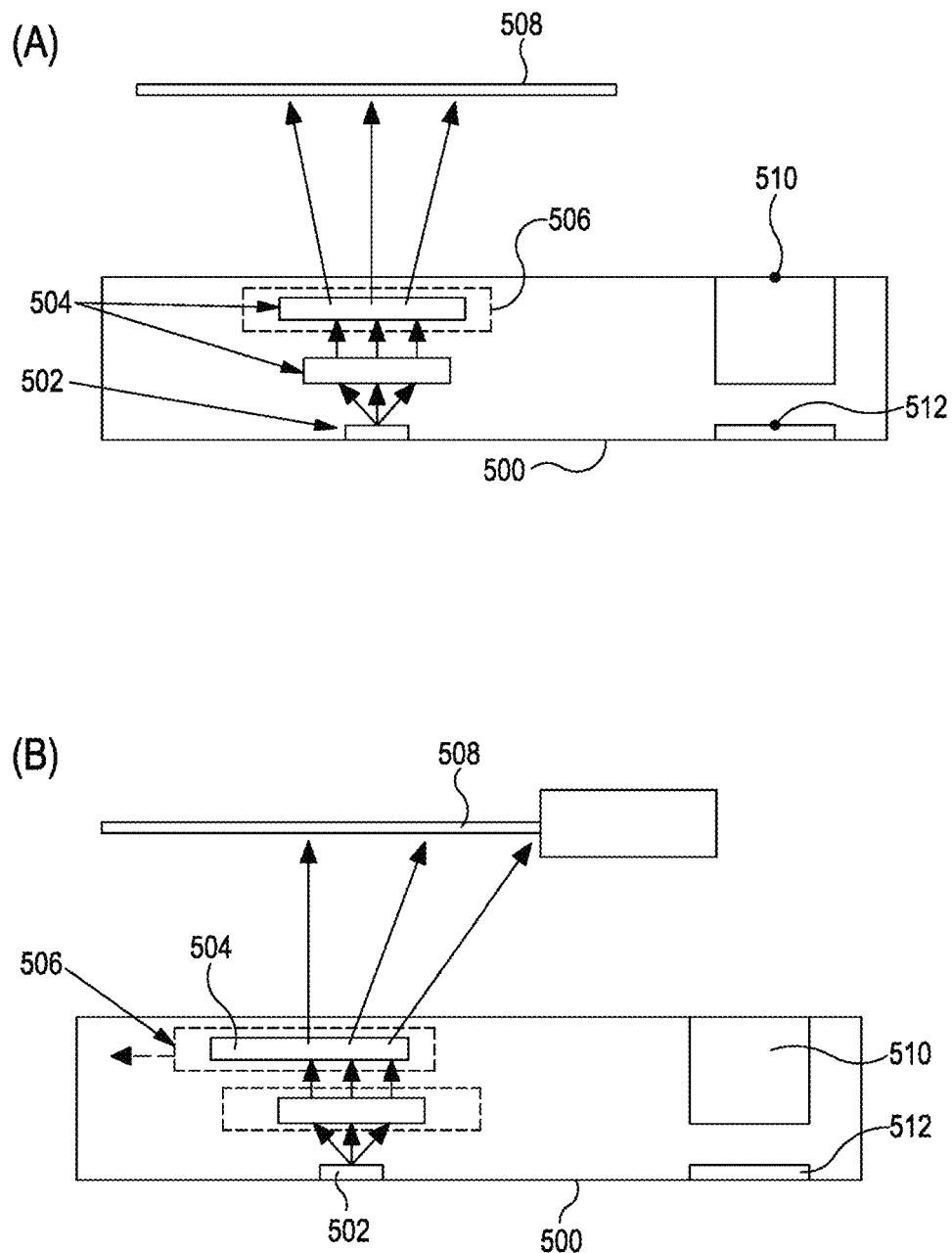
Figure 6:
Figure 6:
Figure 7:
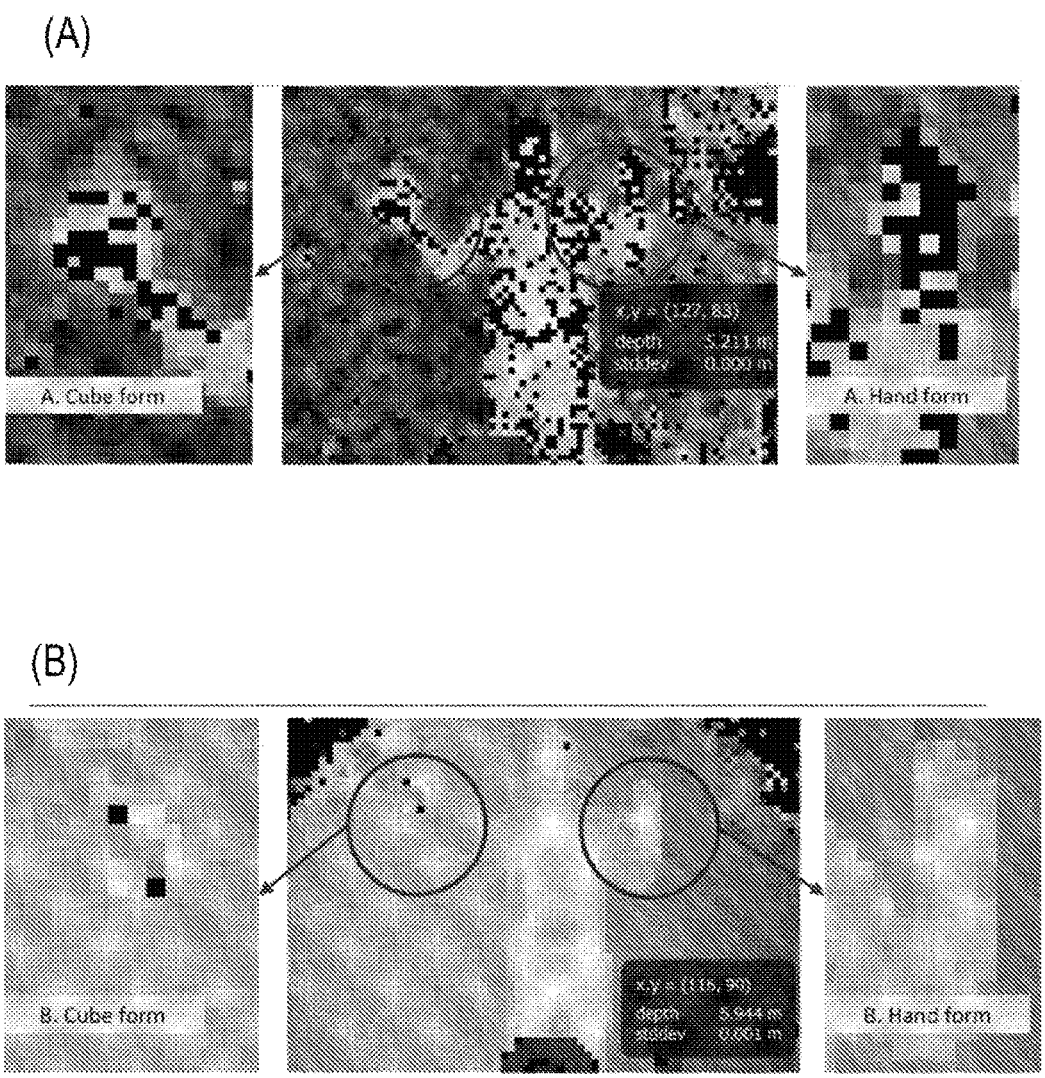
Figure 8:
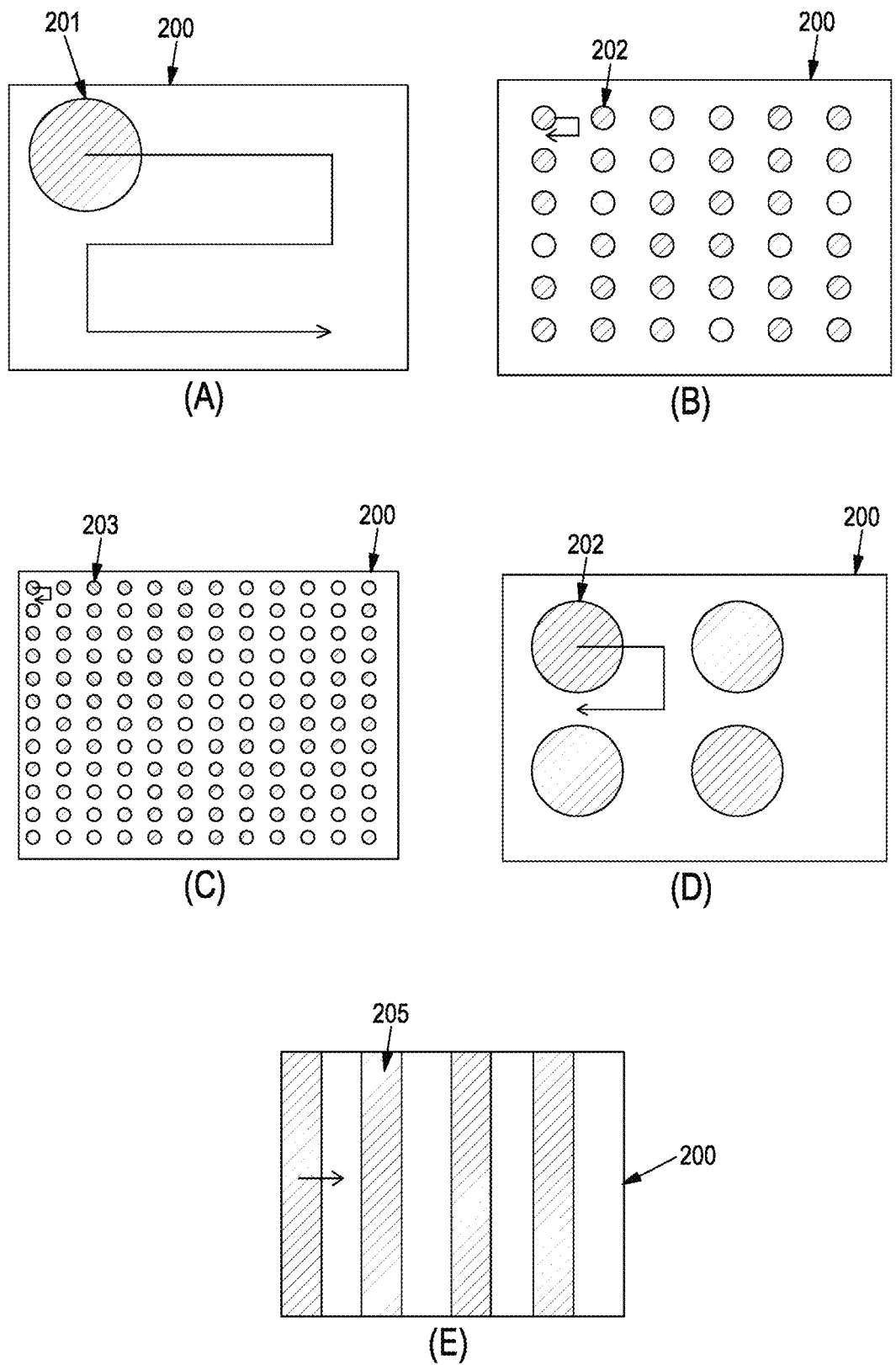

FIGS. 3A and 3B respectively show a nine-point and a five-point scanning pattern using circular illumination FIG. 4A shows a six-point scanning pattern using a dot pattern of light;

FIG. 4B shows a three-point scanning pattern using a striped light pattern;

FIGS. 5A and 5B respectively show a block diagram of an apparatus for generating a 3D representation in which illumination is directed on the centre of a scene and on the right-side of the scene;

FIGS. 6A and 6B respectively show images captured by a ToF imaging system emitting uniform illumination and non-uniform illumination;

FIGS. 7A and 7B respectively show a zoomed-in view of the images shown in FIGS. 6A and 6B;

FIGS. 8A-E are schematic representations of several illumination patterns;

FIGS. 9A-D are schematic representations of various configurations which may be used to produce one or more of the illumination patterns of FIGS. 8A-E;

FIGS. 10A and B are schematic representations of a configuration in which a ball lens is used to move an illumination pattern as per FIG. 8; and FIGS. 11a and 11B are schematic representations of a configuration in which a microlens array is used to move an illumination pattern as per FIG. 8.

Broadly speaking, embodiments of the present techniques provide apparatus and methods for generating a three-dimensional (3D) representation of a scene (also known as 3D sensing) using a time-of-flight imaging system. In particular, the present techniques provide an apparatus comprising a time-of-flight imaging camera system that emits illumination having a spatially-nonuniform intensity over the field of view of the sensor and that is moved across at least part of the field of view of the sensor using an actuation mechanism.

Time-of-flight (ToF) camera systems are known for measuring long distances—they are, for example, used to measure distance in building surveys. Time of flight camera systems work by estimating the time taken for a pulse of light to travel from an emitter to a sensor/receiver/detector. The estimate of time (in seconds) can be converted into a distance (in metres) simply by multiplying the time by half the speed of light (i.e. $1.5 \times 10^8$ ms$^{-1}$). The time measurement in this system will need to be both accurate and precise, preferably with at least nanosecond resolution.

Invisible light wavelengths may be used for ToF camera systems to avoid disturbing the scene that is being imaged (which may also be being captured with a visible light camera). The Near Infrared [NIR] band (wavelengths 750 nm to 1.4 m) is typically chosen due to the availability of small (portable) lasers with good resolving potential, whilst being free of absorption lines.

There are several different mechanisms for detecting time of flight, but most practical 2D sensors work on a modulation principle where many pulses of light are emitted and the phase shift of the received light is measured. Modulation frequencies are typically in the range 1 to 100 MHz (i.e. pulses of 10 ns to 1 μs) and that, in turn, determines the maximum range which can be measured (due to the inability to distinguish time aliases). A modulation of 1 to 100 MHz corresponds to a maximum range of roughly 150 m to 1.5 m (respectively).

It is possible to design cameras with the required level of performance under ideal conditions, but practical signal-to-noise levels reduce the available performance most particularly in terms of depth range and depth resolution. The typical issue is that other sources of illumination, and especially direct sunlight, increase background illumination which can swamp the time of flight signal and make detection of time of flight more difficult (noisier) or impossible (no detection at all). Output power from the illumination source cannot typically be increased due to both power constraints (devices are typically operating in the 1-8 W instantaneous power range), and because there may be strict limits on optical power output from lasers to prevent user injury.

Certain applications require accurate depth measurement at long distances. For example, artificial and augmented reality systems and collision detection systems in vehicles or robotic devices, may require accurate depth measurement over a long range, e.g. 10 cm depth resolution at a distance of 10 m away from the imaging system.

Indirect time-of-flight cameras typically attempt to flood-illuminate the object field, and may have a viewing angle of 60×45°. This may be achieved using a VCSEL array (vertical-cavity surface-emitting laser array) as the light source, and a diffuser to ensure an even spread of illumination over the object field. Given the electrical and optical power constraints of a typical ToF camera system, this may mean that good quality depth-sensing capability is limited to a distance of around 4 metres, and so when the object is e.g. 6 metres away no useful depth information is returned at all.

Accordingly, the present applicant has identified the need for an improved mechanism for using ToF to perform 3D sensing at long distances.

A PMD Flexx ToF system comprising a VCSEL array was tested to determine how the resolution of a ToF-based 3D sensing system may be improved for longer distances. The ToF system was set-up to image a person standing at least 5 metres away from the system, with their left hand thumb splayed out and holding a ~10 cm cube in their right hand. The system was set to capture 5 fps (frames per second) for all tests. The tests sought to determine whether it was possible to clearly distinguish (i) the person's general body form, (ii) the left hand shape and individual fingers of the left hand, and (iii) the cube shape, at a variety of distances using uniform and non-uniform illumination.

FIG. 6A shows an image captured by the ToF imaging system when the ToF system emits uniform illumination at the person being imaged was ~5.2 metres away from the camera. This shows that the entire scene is well-illuminated by the ToF imaging system. FIG. 6B shows an image captured by the ToF imaging system when the ToF system emits (spatially-)non-uniform illumination. The non-uniform illumination was achieved by removing the diffuser from the ToF system. In FIG. 6B, the person being imaged was ~6 metres away from the camera. This shows that the centre of the scene is better illuminated than the edges of the scene (i.e. has increased central scene illumination), but, as a result, the accuracy and/or range of the depth information at the centre of the scene is improved.

FIGS. 7A and 7B respectively show a zoomed-in view of the images shown in FIGS. 6A and 6B. With respect to determining (i) the person's general body form, FIG. 7A (uniform illumination) shows a coarse body form and poor depth distinction, whereas FIG. 7B (non-uniform illumination) shows a more clear, distinct body form and clear change in depth from the middle of the person's torso to the edge of their torso. With respect to determining (ii) the left hand shape and individual fingers of the left hand, the hand shape is not well defined in FIG. 7A, but in FIG. 7B the hand shape is clearer and the thumb is just noticeable. With respect to determining (iii) the cube shape, the cube is distorted in FIG. 7A, while the cube's square edge form is more noticeable in FIG. 7B. Thus, the tests indicate that there is improvement in the accuracy of the depth information of a ToF based 3D sensing system at increased distances if the majority of the illumination is focussed on ~25% of the field of view. More generally, the illumination may be focussed on between ~1% and ~50% of the field of view or between ~10% and ~40% of the field of view or between ~20% and ~30% of the field of view.

Thus, the present applicant has found that by removing the diffuser of a typical ToF camera system, non-uniform illumination is emitted by the system (i.e. the illumination is higher at the centre than at the edges), and furthermore, the modified camera system allows more accurate depth information to be obtained at an increased distance (e.g. 7 metres or more). Electrical power and total optical flux through the exit pupil of the camera system are unaltered, but the peak illumination in the object field is increased. In this sense, a trade-off has been achieved between coverage of the field of view on the one hand and Z (depth) range and/or accuracy on the other.

The present applicant has discovered that in order to compensate for the loss of XY illumination in the object field, an actuation mechanism is required to move the emitted light around the scene being imaged.

Thus, the present techniques provide an apparatus for generating a three-dimensional representation of a scene, the apparatus comprising: a time-of-flight (ToF) imaging camera system comprising a multipixel sensor having a field of view and further comprising a light source and arranged to emit illumination having a spatially-nonuniform intensity over the field of view of the sensor; and an actuation mechanism for moving the emitted non-uniform illumination across at least part of the field of view of the sensor, thereby enabling generation of the representation.

Figure 1:
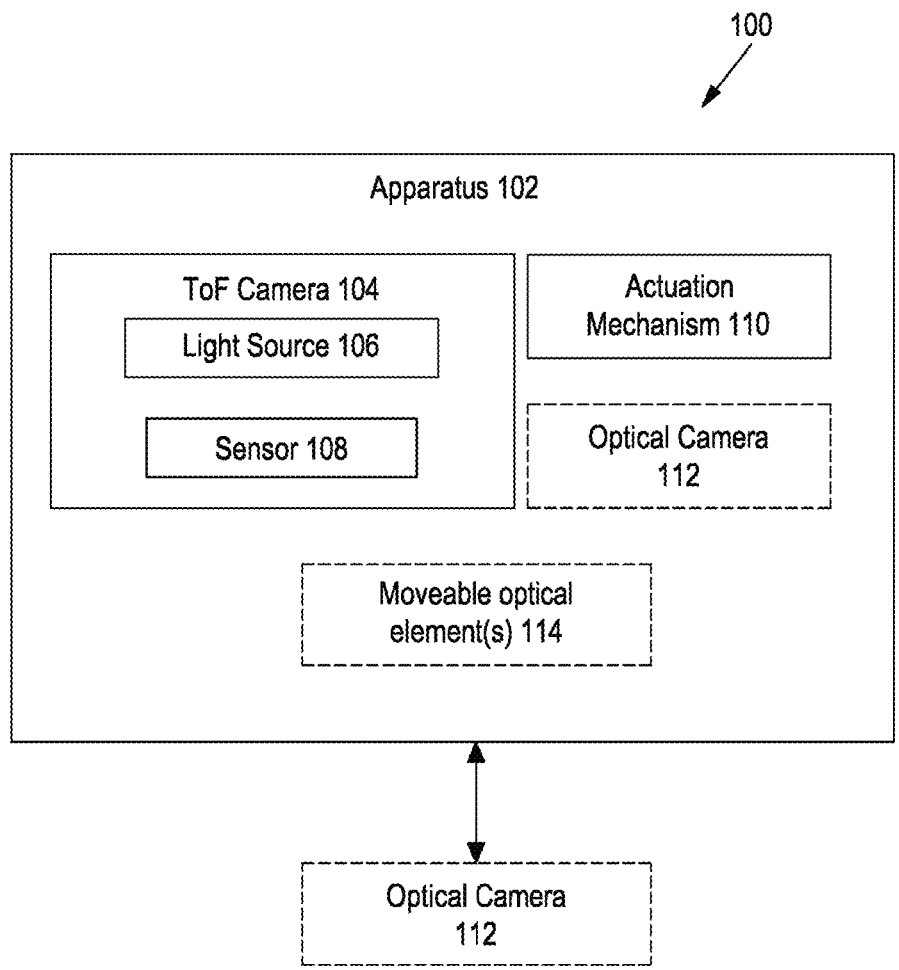
FIG. 1 shows a schematic diagram of an apparatus or system for generating a three-dimensional (3D) representation of a scene using a time-of-flight (ToF) camera.

Turning now to FIG. 1, this shows a schematic diagram of an apparatus 102 or system 100 for generating a three-dimensional (3D) representation of a scene using a time-of-flight (ToF) camera. For example, the apparatus 102 may be, or may be included in, any of: a smartphone, a mobile computing device, a laptop, a tablet computing device, a security system, a gaming system, an augmented reality system, an augmented reality device, a wearable device, a drone, an aircraft, a spacecraft, a vehicle, an autonomous vehicle, a robotic device, a consumer electronics device, a domotic device, and a home automation device.

The apparatus 102 comprises a time-of-flight (ToF) camera 104 comprising a light source 106 and arranged to emit non-uniform illumination. The ToF camera 104 may comprise a multipixel sensor or detector 108 for receiving reflected light from a field of view.

The non-uniform illumination may be any form of illumination, and may be provided/emitted by any suitable light source 106. For example, the light source 106 may be a source of non-visible light or a source of near infrared (NIR) light, for the reasons explained above. The light source 106 may comprise at least one laser, laser array (e.g. a VCSEL array), or may comprise at least one light emitting diode (LED). The non-uniform illumination emitted by the light source 106 (or by the overall apparatus 100) may have any form or shape. For example, the non-uniform illumination may be a light beam having a circular beam shape (as shown on the left-hand side of FIG. 3A for example), or may comprise a pattern of parallel stripes of light (as shown on the left-hand side of FIG. 4B for example), or may comprise a uniform or non-uniform pattern of dots or circles of light (as shown on the left-hand side of FIG. 4A for example). It will be understood that these are merely example types of illumination and are non-limiting.

Generally speaking, the present applicant has discovered that if an increase in range by a factor of two is required, then four times more illumination intensity in the far-field (object field) will be required in order to preserve signal-to-noise ratio.

The apparatus 102 comprises an actuation mechanism 110 for moving the emitted non-uniform illumination across at least part of the field of view of the sensor 108. The actuation mechanism 110 may be any suitable actuation mechanism for incorporation into the apparatus 102 and for use in an imaging system. For example, the actuation mechanism 110 may be a shape memory alloy (SMA) actuation system, which comprises at least one SMA actuator wire. The at least one SMA actuator wire may be coupled to the or each element of the apparatus 102 which may be moved in order to move the emitted non-uniform illumination across at least part of the scene. Additionally or alternatively, the actuation mechanism 110 may comprise a voice coil motor (VCM), or an adaptive beam-steering mechanism for steering the non-uniform illumination (which may comprise an electrically switchable spatial light modulator). The actuation mechanism 110 may be arranged to move the emitted non-uniform illumination by moving any one of the following components of the apparatus 102 or ToF camera 104: a lens, a prism, a mirror, a dot projector, and the light source 106.

In embodiments, the apparatus 102 may comprise at least one moveable optical element 114 which is provided 'in front of' the light source 106, i.e. between the light source 106 and the object field/scene. The actuation mechanism 110 may be arranged to spin or rotate, or otherwise move, the optical element 114 in order to move the emitted non-uniform illumination. The optical element 114 may be any one of: a lens, a prism, a mirror, and a diffraction grating.

FIGS. 5A and 5B respectively show a block diagram of an apparatus 500 for generating a 3D representation in which illumination is directed on the centre of a scene and on the right-side of the scene. The apparatus 500 comprises a light source 502 (e.g. a VCSEL array). The light emitted by the light source 502 may pass through one or more optical elements 504 (e.g. lenses, mirrors, diffraction gratings, etc.) before being emitted from the apparatus 500 and projecting onto a scene/object field 508. The apparatus 500 may comprise a receiver lens and filter system 510, and a multipixel sensor/detector 512 for sensing reflected light. One or more of the optical elements 504 may be coupled to an actuation mechanism 506. The actuation mechanism 506 is arranged to move the optical element 504 to which it is coupled. FIG. 5A shows the optical elements 504 in their central or default position, which causes the emitted non-uniform illumination to project onto the centre of the scene 508 corresponding to the field of view of the sensor 512. FIG. 5B shows how one of the optical elements 504 may be moved by the actuation mechanism 506 in order to move the non-uniform illumination to different areas of the scene 508. In the illustration, moving an optical element 504 to the left of the figure may cause the non-uniform illumination to be projected on the right side of the scene 508. Thus, an actuation mechanism 506 may be used to steer the illumination onto specific objects or areas in the scene 508 during imaging, thereby illuminating the entire scene 506 with increased intensity such that the improved, increased image resolution may be achieved over a larger area.

Returning to FIG. 1, the actuation mechanism 110 may be used to move/steer the emitted non-uniform illumination in a scanning pattern across at least part of the field of view of the sensor 108. For example, FIGS. 3A and 3B respectively show a nine-point and a five-point scanning pattern using a circular beam. The scanning pattern may be a raster scanning pattern. The scanning pattern may be boustrophedonic. It can be seen from FIGS. 3A and 3B that increasing the number of points of the scan pattern may result in a more uniformly illuminated field of view, which may allow improved resolution across the whole field of view. However, the more points in the scans, the more frames which need to be captured and combined in order to generate the 3D representation. The more frames there are, the slower and more difficult it may be to combine the frames accurately, and there may be a greater chance of unresolvable discrepancy between the frames. In some cases, the scan pattern shown in FIG. 3B may be preferred where it is acceptable to sacrifice illumination in the corners of the field of view for improved coverage and better resolution near the centre of the field of view. Thus, the scanning pattern may be chosen to suit the application.

In FIGS. 3A and 3B, the non-uniform illumination is a substantially circular beam of light, which may simply be the far-field radiation pattern of the light source without any additional optics. A disadvantage of this type of illumination may be that large steering angles are required to ensure the illumination is projected across the whole field of view of the sensor 108. For example, for a 60° field of view, the illumination may need to be steered through roughly 40° along one axis (e.g. the horizontal axis) in order to cover substantially the whole field of view of the sensor 108 (i.e. the scene for which a 3D representation is to be generated). This may be difficult to achieve by directly moving the light source itself (or any other optical element) because of the difficulty making reliable electrical connections to something which needs to move large distances very rapidly and very frequently (e.g. millions of repeat cycles).

To reduce the amount by which the illumination needs to move in order for the illumination to cover substantially the whole field of view of the sensor 108 when a scanning pattern is applied, an illumination which is or comprises a pattern of light may be advantageous. Thus, optical elements, such as dot projectors or gratings, may be used to fill the object space field of view but with a low fill-factor. This ensures that bright illumination is projected onto the field of view, but reduces the required movement to illuminate the entire field of view when the illumination is moved in a scanning pattern across the field of view to approximately plus or minus half the average gap. FIG. 4A shows a six-point scanning pattern using a dot pattern of light, and FIG. 4B shows a three-point scanning pattern using a striped light pattern. In FIG. 4A, the scanning pattern comprises moving the illumination along two axes, e.g. side-to-side and up-and-down. Increasing the number of points in the scanning pattern may result in a more uniformly illuminated field of view, as described above. In FIG. 4B, the scanning pattern comprises moving the illumination along one axis e.g. side-to-side, or in one direction (e.g. left to right). Thus, having a striped illumination may be advantageous, and the actuation mechanism is only required to move an object unidirectionally. Thus, the scanning pattern implemented by the actuation mechanism may comprise moving the emitted non-uniform illumination along one axis across at least part of the field of view, or along two axes across at least part of the field of view.

With respect to patterned illumination (e.g. the patterns shown in FIGS. 4A and 4B), the pattern may be regular or irregular. This is in contrast to 3D sensing systems which use structured light emitters—here, there is a requirement that the projected pattern is sufficiently irregular such that the projected dots can be uniquely identified and mapped to their reflections. Furthermore, there is no requirement that the light of a ToF system to be accurately focussed on the object of interest/object being imaged, in contrast to the structured light systems.

Whatever type of illumination is used, the actuation mechanism may move the emitted non-uniform illumination to discrete positions in the field of view, or may move the emitted non-uniform illumination continuously across at least part of the field of view. This is because ToF measurement techniques rely only on illumination intensity over a period, and there is no need for the actuation mechanism to come to rest in order for the scene to be sampled.

Referring to FIGS. 8A-E, certain examples of optical fields which can be produced by certain variations of the apparatus 102 of FIG. 1 will now be described. In each of these variations, the apparatus 102 includes a vertical cavity surface emitting Laser (VCSEL) as the light source 106.

FIG. 8A illustrates an optical field having a single high-intensity region 201. Within the region 201, the irradiance is broadly constant at the peak illumination intensity. This optical field can be achieved by using only the VCSEL 106 with no additional optical components. A simple lens element may be used to control the size of the region 201, thereby controlling the intensity of the peak illumination and the proportion of the field of view 200 of the sensor 108 that is illuminated (at a given distance, e.g. ~3-10 metres). To scan the field of view 200 the region 201 must be steered through relatively large angles, as illustrated.

FIG. 8B illustrates an optical field with a pattern corresponding to a projection of the VCSEL pattern and with multiple high-intensity regions 202. Within each of these regions 202, the irradiance is approximately constant and is close to the peak illumination intensity. Each region 202 corresponds to the light emitted from a single VCSEL cavity. Therefore, the design of the VCSEL 106 determines the pattern of the optical field. To produce such a pattern, the apparatus 102 must generally include lens element(s) focused on the plane from which the VCSEL 106 emits. These lens element(s) may be a ball lens or a microlens array, as will be explained below with reference to FIGS. 10 and 11. The pattern is spread over the field of view 200 of the sensor 108. As illustrated, the steering angle required to scan the field of view 200 has been reduced considerably compared to FIG. 8A.

FIG. 8C illustrates an optical field with a pattern corresponding to a projection of the VCSEL pattern that has been split by a diffractive optical element or beam splitter. The pattern includes multiple high-intensity regions 203, within each of which the irradiance is approximately constant and is close to the peak illumination intensity. Corresponding regions 203 within each of the multiple copies of the VCSEL pattern correspond to the light emitted from a single cavity within the VCSEL 106. Therefore, the design of the VCSEL 106 determines the pattern within each of these copies. An optical element, such as a holographic diffractive element, is used to split the VCSEL pattern. This could split the VCSEL pattern into an M×N array. In the example shown, M=2 and N=2. The pattern is spread over the field of view 200 of the sensor 108. Compared to FIG. 8*b* (and with a similar VCSEL 106), the number of regions is higher and so the required steering angle is lower, as illustrated.

FIG. 8D illustrates an optical field corresponding to a single beam from the VCSEL 106 (cf. FIG. 8A) that has been split into a pattern of multiple beams 204 by a diffractive optical element or beam splitter. In particular, the optical element splits the input beam into a M×N array of output beams 204. In this example, the array is a 2×2 array. Various different types of optical elements could be used. As per FIGS. 8B-D, the pattern reduces the steering angle required to scan the field of view 200 of the sensor 108.

FIG. 8E illustrates an optical field corresponding to a single beam from the VCSEL 106 (i.e. made up from all the VCSEL cavities) that has been split into a series of stripes 205 using a suitable diffractive optical element. Such a pattern requires motion in only one direction in order to fill the field of view 200 of the sensor 108.

FIGS. 9A-D, 10 and 11 illustrate certain variations of the apparatus of FIG. 1. In each of these variations, the apparatus 102 includes a VCSEL as the light source 106 and a set of one or more optical elements (hereinafter sometimes referred to as an optical stack). The pattern of non-uniform illumination produced by the VCSEL 106 and the optical stack can be steered around the field of view 200 of the sensor 108 by an actuation mechanism 110 corresponding to a miniature actuator, e.g. a SMA-based actuator. The optical stack may include lens elements for collimation of the light, diffractive optical elements for optical field control as well as additional lens elements to reduce distortion and improve performance.

Figure 9:
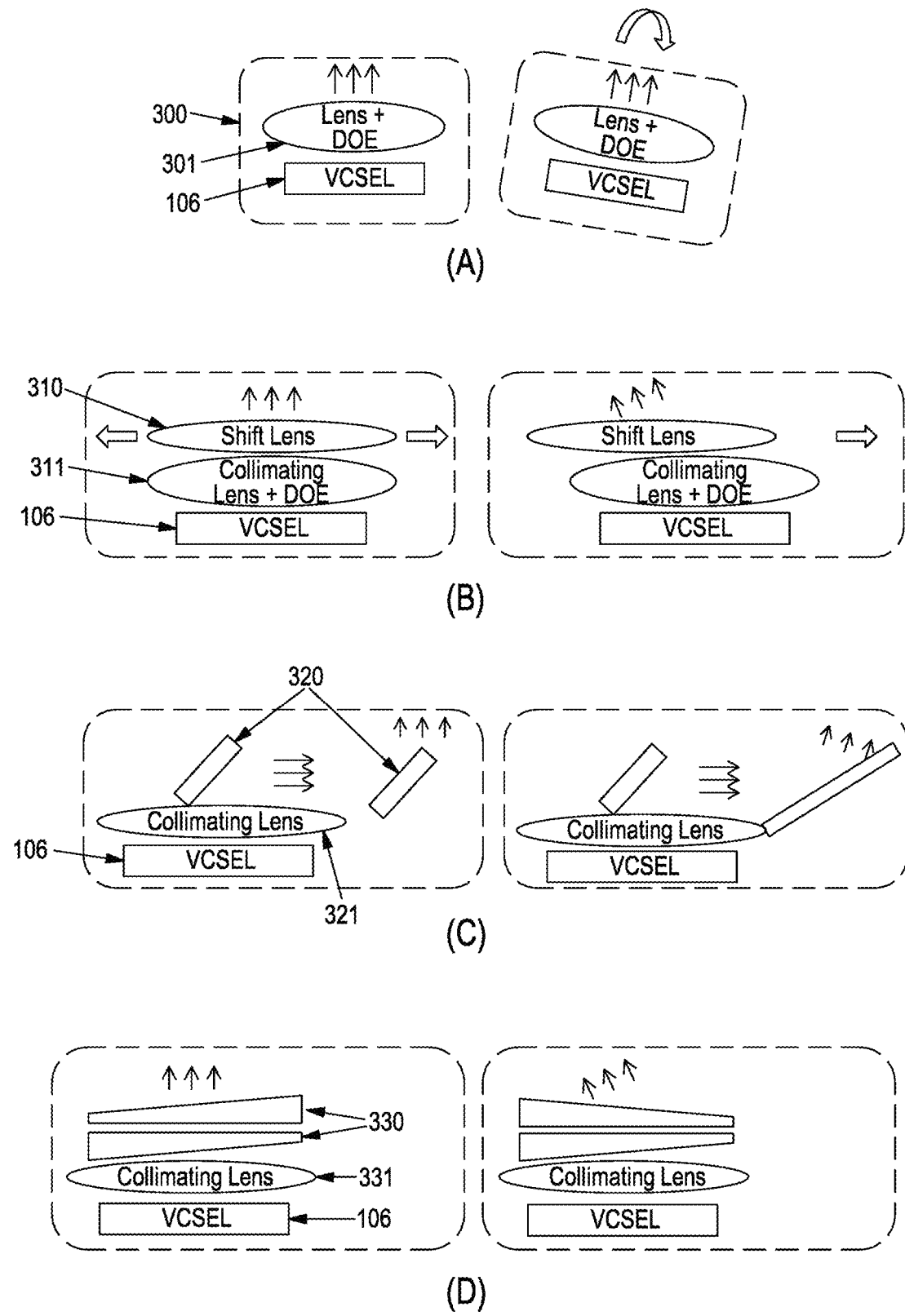

FIG. 9A illustrates an example in which the miniature actuator 110 tilts a submodule 300 which is made up of the VCSEL 106 and the optical stack 301. The VCSEL 106 and the optical stack 301 have a fixed position and orientation relative to each other. By tilting the submodule 300 away from an optical axis, the light can be steered. In some example, the submodule 300 can be tilted in both directions away from the optical axis.

FIG. 9B illustrates an example in which the miniature actuator 110 is used to shift a lens 310 to steer the light. The optical stack also includes a collimation lens 311 and, in some examples, an optional diffractive element. In the illustrated example, the collimation lens 311 and the shift lens 310 are separate. However, the collimation lens and shift lens may be the same lens element as is the case in the example of FIG. 10 (see below). Translational movement of the shift lens 310 in directions perpendicular to the optical axis result in steering of the light.

FIG. 9C illustrates an example in which a mirror system 320 is used to steer the light. As in FIGS. 9A and 9B, the optical stack may include optional lens and diffractive elements 321. In this example, a system of two mirrors 320 is used to steer the light. By changing the angle between the mirror and the optical axis the pattern can scan the field of view 200 of the sensor 108. The light may be steered by a single actuated mirror capable of rotation about two orthogonal axes. Alternatively, each of the two mirror could be capable of rotation about a single axis, with the axes of the two mirrors being orthogonal. In another example, the apparatus 102 may have a single mirror and the VCSEL 106 may emit light at ~90° to the final general direction.

FIG. 9D illustrates an example in which a pair of prisms 330 is used to steer the light. Again, the optical stack may include an optional collimation lens plus diffractive elements 331. The light can be steered by adjusting the relative orientation of the prisms 330 compared to each other and compared to the VCSEL 106.

Figure 10:
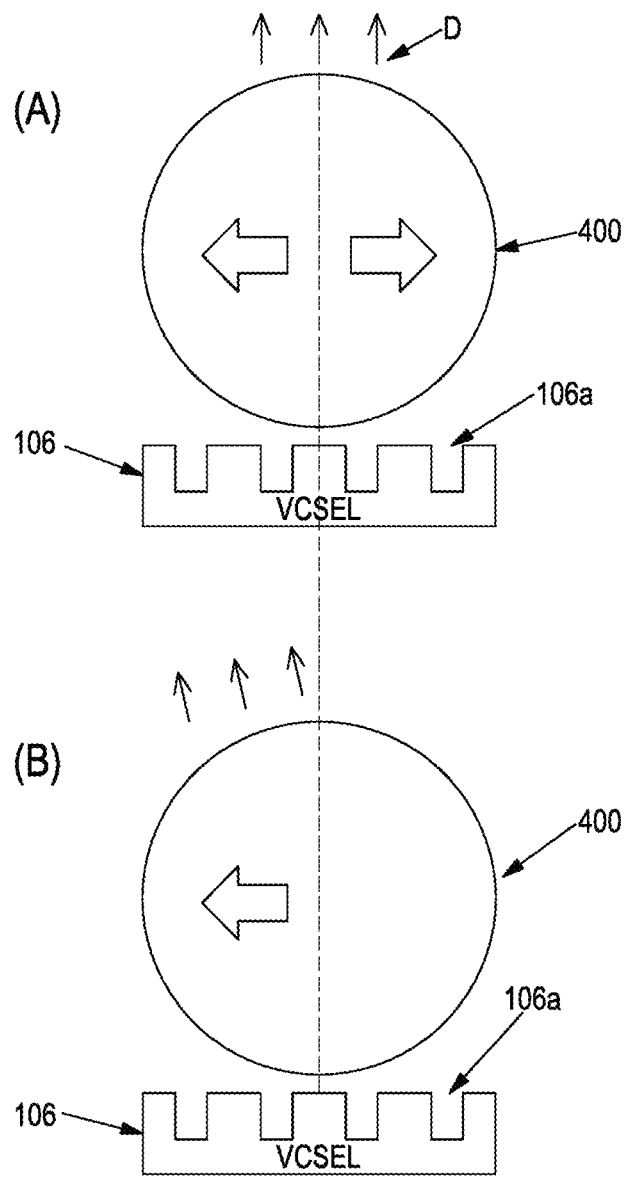

FIG. 10 illustrates another example in which a ball lens 400 is used to project the pattern of the VCSEL 106 into the far field. The ball lens 400 has a short back focal length and so is positioned suitably close to the surface of the VCSEL 106. The back focal length for a ball lens with a diameter between 0.5 mm and 2 mm is typically below ~0.3 mm.

The position of the pattern can be controlled by translating the ball lens 400 in a direction perpendicular to the direction D in which the light is generally emitted. The short back focal length increases the beam steering achieved for a given translation. Hence a miniature actuator 106 can readily be used to control the position of the lens 400.

The ball lens 300 may be constructed from optical glass, glass, plastic, or other optical materials, and may be coated with antireflective coatings specifically tuned to the wavelength of the VCSEL 106.

In FIG. 10, additional optical components (not shown) may also be included in the optical stack. For example, a diffractive optical element may be used to create a more detailed pattern, or an additional lens element may be added to reduce distortion of the pattern in the far field.

Figure 11:
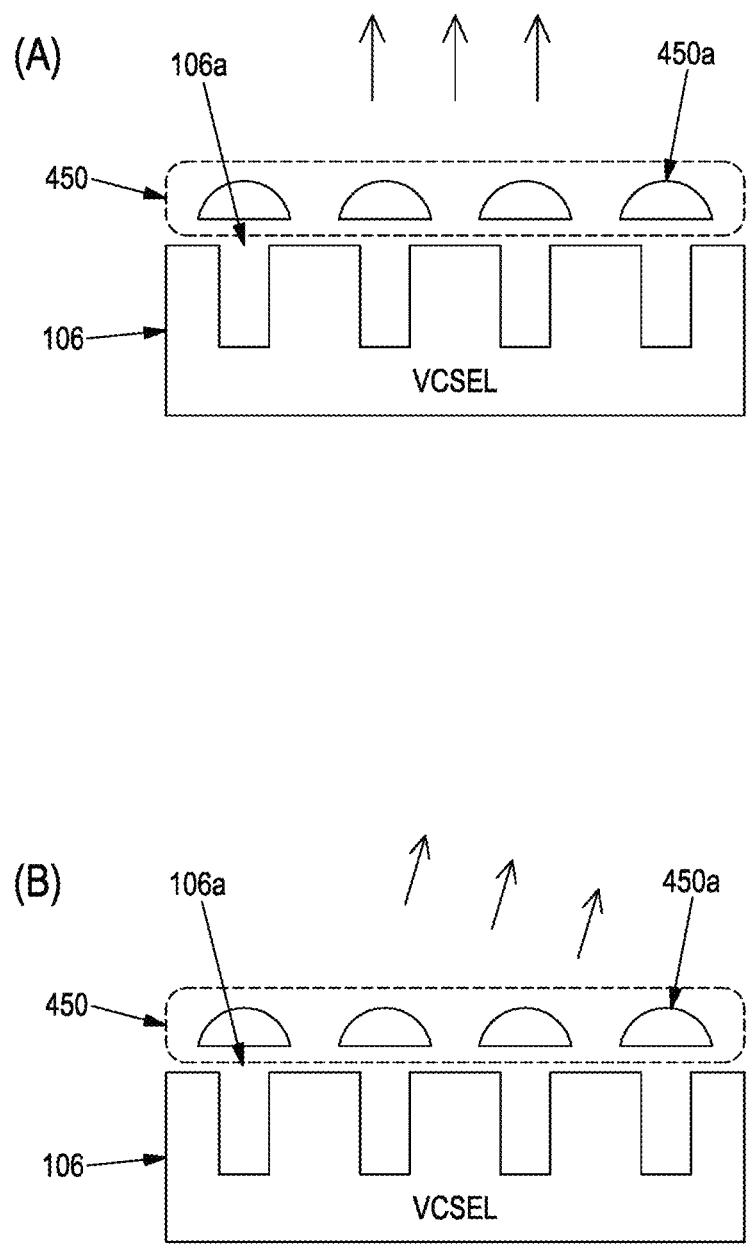

FIG. 11 illustrates an example with a microlens array 450 arranged in proximity to the VCSEL 106. The microlens array 450 is used to produce the pattern of illumination in the far field. The microlens array 450 is made up of multiple microlenses 450*a*. There is a microlens 450*a* over each individual VCSEL cavity 106*a*. The microlens 450*a* is preferably designed to collimate the light from each cavity 106*a*.

The position of the pattern in the far field can be controlled by translating the microlens array 450 in a direction perpendicular to the direction in which the light is generally emitted. Each microlens 450*a* can have a very short focal length so, again, relatively large steering angles can be achieved with relatively small displacements.

Alternatively, the microlens array 450 may have a fixed position relative to the VCSEL 106 and other optical elements in the apparatus 102 may be translated to steer the pattern of light. The microlens array 450, in both the actuated and static cases, may be included together with additional optical components in the optical stack. For example, a diffractive optical element may be used to create a more detailed pattern, or an additional lens element may be added to reduce distortion of the pattern in the far field.

The microlens might be manufactured at the wafer level to produce cost-effective miniature arrays.

A typical sensor 108 may have a field of view 200 of ~62°×~45°. The example illustrated in FIG. 10 involving the ball lens 400 may be able to achieve steering of between 0.025° and 0.07° per μm of shift/stroke. The example illustrated in FIG. 11 involving the microlens array 450 may require a significantly lower stroke for the same steering.

In embodiments, the illumination pattern could be selected to be non-uniform over the field of view, which could help provide selective enhancement of range and resolution in a particular field of view. For example, in embodiments, an initial scan of the field of view may be performed to identify one or more objects or regions of interest. Thereafter, the illumination may be concentrated onto the object(s)/region(s) of interest. Returning to FIG. 1, the ToF imaging camera 104 of the apparatus 102 may be arranged to perform an initial scan of the field of view to identify one or more objects/regions of interest in the field of view. Alternatively, a separate camera 112 may be used. For example, an optical camera 112 that is either part of the apparatus 102 or separate, may be arranged to perform an initial scan of the field of view to identify one or more objects/regions of interest in the field of view. However the initial scan is performed, the actuation mechanism may then move the emitted non-uniform illumination primarily across the identified one or more objects of interest in the field of view.

Figure 2:
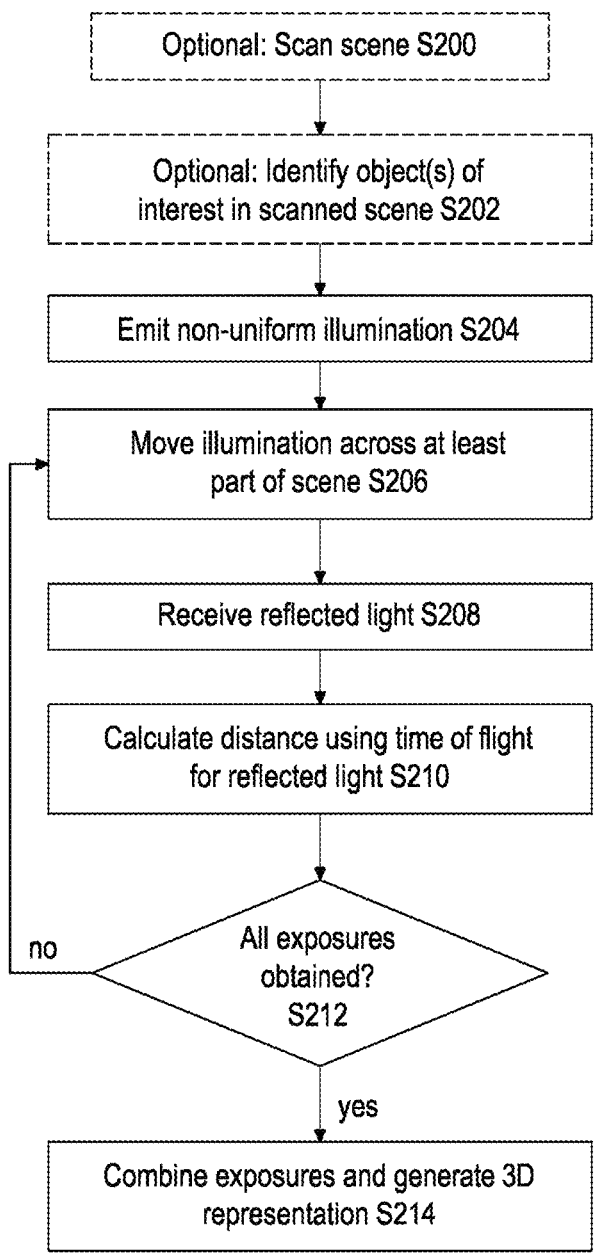
FIG. 2 shows a flowchart of example steps for generating a 3D representation of a scene.

FIG. 2 shows a flowchart of example steps for generating a 3D representation of a scene using an apparatus or system described with reference to FIG. 1. The method begins at step S204 by emitting, using a time-of-flight (ToF) imaging camera system of the apparatus, non-uniform illumination onto the scene/field of view of a sensor (step S204). The method comprises moving, using an actuation mechanism of the apparatus, the emitted non-uniform illumination relative to, and across at least part of, the field of view of the sensor (step S206). The sensor/detector receives reflected light (step S208) and the time of flight (i.e. time taken between emitting the light and receiving the reflection) is used to determine the depth of the objects in the field of view (step S210). At step S212, the process checks if all exposures/frames have been obtained in order to generate the 3D representation. If not, the process returns to step S206. If yes, the exposures/frames are combined to generate a 3D representation (step S214).

Optionally, the method may begin by performing an initial scan of the field of view (step S200) and identifying one or more objects (or regions) of interest in the field of view (step S202). In this case, the step of moving the non-uniform illumination (step S206) may comprise moving the emitted non-uniform illumination across at least the identified one or more objects of interest in the field of view.

In embodiments, the emitted non-uniform illumination may be moved based on both the regions or objects of interest in the field of view and the intensity or signal-to-noise ratio of the received/detected reflected light. For example, if very little light is detected by the sensor/detector, the system may determine that the object/region of interest is too far away and so may move the illumination to a new position. Similarly, if the intensity of the reflected light is very high, then sufficient information about the field of view may be gathered relatively quickly, such that the illumination can be moved to a new position (to capture information about another object/region of the field of view) relatively quickly, whereas if the intensity of the reflected light is low, the illumination may need to be held in position for longer to allow enough information to be gathered to produce a reliable 3D image. Thus, in embodiments, the actuation mechanism may move the emitted non-uniform illumination in response to intensity and/or signal-to-noise ratio of sensed reflected light.

It will be appreciated that there may be many other variations of the above-described embodiments.

For example, the optical element may be any one of: a lens, a prism, a mirror, and a diffraction grating.

The actuation mechanism may include a voice coil motor (VCM).

The actuation mechanism may be arranged to move the emitted illumination by moving any one of: a lens, a prism, a mirror, a dot projector, and the light source.

The apparatus may comprise an optical element arranged between the light source and the scene and the actuation mechanism may be arranged to spin or rotate the optical element.

References to the field of view of the sensor may refer to the field of view of the sensor plus any associated optical elements.

The invention claimed is:

1. An apparatus for use in generating a three-dimensional representation of a scene, the apparatus comprising:
   a time-of-flight (ToF) imaging camera system comprising a multipixel sensor and a light source and arranged to emit illumination having a spatially-nonuniform intensity over the field of view of the sensor, wherein the light source comprises a plurality of lasers arranged in an array; and
   an actuation mechanism for moving the illumination across at least part of the field of view of the sensor, thereby enabling generation of the representation, wherein the actuation mechanism comprises at least one shape memory alloy (SMA) actuator;
   wherein the actuation mechanism further comprises at least one lens movable in one or more orthogonal directions in a plane at least substantially parallel to the array of lasers to move the illumination across the at least part of the field of view of the sensor.

2. The apparatus according to claim 1, wherein the spatially-nonuniform intensity corresponds to a set of regions within which the emitted intensity is substantially constant and/or within which the emitted intensity is at least 50% of a maximum level.

3. The apparatus according to claim 2, wherein the set of regions together cover between 1% and 50% of the field of view of the sensor at a given instant of time, optionally wherein the set of regions together cover more than 10% and less than 50% or less than 40% or less than 30% or less than 20% of the field of view of the sensor at a given instant of time, optionally wherein the set of regions together cover more than 20% and less than 50% or less than 40% or less than 30% of the field of view of the sensor at a given instant of time, optionally wherein the set of regions together cover more than 30% and less than 50% or less than 40% of the field of view of the sensor at a given instant of time, and optionally wherein the set of regions together cover more than 40% and less than 50% of the field of view of the sensor at a given instant of time.

4. The apparatus according to claim 2, wherein the actuation mechanism moves the illumination in a scanning pattern across at least part of the field of view of the sensor.

5. The apparatus according to claim 4, wherein the scanning pattern comprises moving the illumination along one axis across the at least part of the field of view of the sensor.

6. The apparatus according to claim 4, wherein the scanning pattern comprises moving the emitted illumination along two axes across at least part of the scene.

7. The apparatus according to claim 5, wherein the set of regions are arranged such that the movement causes the regions to cover more than 75% or more than 90% or substantially all of the field of view of the sensor during a cycle of the scanning pattern.

8. The apparatus according to claim 5, wherein the set of regions are arranged such that the movement avoids regions covering a same part of the field of view of the sensor more than once during a cycle of the scanning pattern.

9. The apparatus according to claim 5, wherein the movement causes a particular point in the spatially-nonuniform intensity to move by less than 50% or less than 40% or less than 30% or less than 20% or less than 10% or less than 5% of the width or height of the field of view of the sensor during a cycle of the scanning pattern.

10. The apparatus according to claim 5, wherein the set of regions have a periodicity in at least one direction of the field of view of the sensor.

11. The apparatus according to claim 1, wherein the emitted illumination: is a light beam having a circular beam shape, or comprises a pattern of parallel stripes of light, or comprises a pattern of dots or circles of light.

12. The apparatus according to claim 2, wherein the apparatus is configured to use information from only those pixels of the sensor that have a field of view within the set of regions at a given instant of time to generate the representation.

13. The apparatus according to claim 2, wherein the emitted illumination has substantially the same time-variation throughout the set of regions.

14. The apparatus according to claim 13, wherein the emitted illumination is varied at high frequency and is moved across the field of view repeatedly with a relatively low frequency.

15. The apparatus according to claim 1, wherein the actuation mechanism moves the emitted illumination to discrete positions on the scene.

16. The apparatus according to claim 1, wherein the actuation mechanism moves the emitted illumination continuously across at least part of the scene.

17. The apparatus according to claim 1, wherein the plurality of lasers corresponds to a vertical-cavity surface-emitting laser (VCSEL) array.

18. The apparatus according to claim 1, comprising:
a focussing lens to focus illumination from the plurality of lasers into a single beam corresponding to a proportion of the field of view of the sensor.

19. The apparatus according to claim 1, comprising:
a plurality of microlenses, each microlens configured to focus illumination from one of the plurality of lasers into one of a plurality of beams, each of the plurality of beams corresponding to a proportion of the field of view of the sensor.

20. The apparatus according to claim 18, comprising:
an optical element configured to split the single beam into a further plurality of beams.

21. The apparatus according to claim 20, wherein the further plurality of beams corresponds to a fan pattern.

22. The apparatus according to claim 1, wherein the actuation mechanism is configured to tilt a submodule comprising the plurality of lasers and one or more further optical element about at least one axis.

23. The apparatus according to claim 1, wherein the at least one lens corresponds to a ball lens.

24. The apparatus according to claim 1, wherein the at least one lens corresponds to the plurality of microlenses.

25. The apparatus according to claim 1, configured to change a direction of the illumination by an angle of more than 0.025° per μm of movement of the at least one lens.

26. The apparatus according to claim 1, wherein the actuation mechanism further comprises at least one tilting mirror to steer the emitted illumination.

27. The apparatus according to claim 1, wherein the actuation mechanism further comprises at least a pair of rotatable prisms to steer the emitted illumination.

28. The apparatus according to claim 1, wherein the actuation mechanism further comprises an adaptive beam-steering mechanism for steering the illumination.

29. The apparatus according to claim 1, wherein the ToF imaging camera system or an optical camera is arranged to perform an initial scan of the scene to identify one or more objects of interest in the scene.

30. A method for use in generating a three-dimensional representation of a scene, the method comprising:
emitting, using a time-of-flight (ToF) imaging camera system, illumination having a spatially-nonuniform intensity over a field of view of a sensor used to receive reflected light wherein the illumination is emitted via a plurality of lasers arranged in an array; and
moving, using an actuation mechanism, the illumination across at least part of the field of view of the sensor, thereby enabling generation of the representation, wherein the actuation mechanism comprises at least one shape memory alloy (SMA) actuator, wherein the actuation mechanism further comprises at least one lens movable in one or more orthogonal directions in a plane at least substantially parallel to the array of lasers to move the illumination across the at least part of the field of view of the sensor.

31. A non-transitory data carrier carrying processor control code to implement the method of claim 30.

* * * * *